United States Patent [19]
Lavigne

[11] 3,909,775
[45] Sept. 30, 1975

[54] METHODS AND APPARATUS FOR ACOUSTIC LOGGING THROUGH CASING

[75] Inventor: Jean C. Lavigne, Arlington, Mass.

[73] Assignee: Schlumberger Technology Corporation, New York, N.Y.

[22] Filed: Oct. 26, 1973

[21] Appl. No.: 409,788

Related U.S. Application Data

[63] Continuation of Ser. No. 323,882, Jan. 15, 1973, abandoned, which is a continuation of Ser. No. 38,984, May 20, 1970, abandoned.

[52] U.S. Cl. .... 340/15.5 BH; 340/15.5 TI; 181/105; 340/18 FM
[51] Int. Cl.² .......................................... G01V 1/40
[58] Field of Search ........ 340/18 FM, 18 P, 18 CM, 340/15.5 BH;15.5 TI, 15.5 A; 181/.5 AC, .5 B, .5 BA

[56] References Cited
UNITED STATES PATENTS
3,697,937  10/1972  Ingram............................ 340/15.5 A
3,732,947  5/1973   Moran et al................... 340/15.5 BH OTHER PUBLICATIONS
White et al., "Computed Response of an Acoustic Logging Tool," 4/68, pp. 302–310, Geophysics, Vol. 33, No. 2, G–222.

Chaney et al., "Same Effects of Frequency Upon the Character of Acoustic Logs," 9/58, pp. 207–212, AIMR Transactions, Vol. 213.

Primary Examiner—Richard A. Farley
Assistant Examiner—N. Moskowitz
Attorney, Agent, or Firm—Brumbaugh, Graves, Donohue & Raymond

[57] ABSTRACT

In accordance with the principles of the present invention, methods and apparatus are provided for evaluating characteristics of a formation behind a casing in a borehole. In the system for obtaining acoustic logs of such formations surrounding the well bore, acoustic energy is repetitively transmitted longitudinally along the borehole and surrounding formations by at least one transmitter and received by at least one receiver longitudinally displaced therefrom. A selected interrelation between the frequency of the impulse generated by the transmitter and the spacing of the receiver relative to the transmitter influence the amount of acoustic energy entering the formations and permit detection of acoustic energy travelling through formations in preference to acoustic impulses set up in the casing.

19 Claims, 4 Drawing Figures

Jean C. Lavigne
INVENTOR

METHODS AND APPARATUS FOR ACOUSTIC LOGGING THROUGH CASING

This is a continuation of application Ser. No. 323,882 filed Jan. 15, 1973 which is a continuation of application Ser. No. 38,984 filed May 20, 1970 both which are now abandoned.

BACKGROUND OF THE INVENTION

As is well-known, the velocity of an acoustic impulse through a medium is functionally related to the character of the medium. In well logging, the porosity of a given formation may be determined from the travel time measurement of an acoustic impulse taken over a given interval of formation. Generally, apparatus for obtaining travel time measurements comprises a logging tool or sonde which is passed through a well bore, surface equipment for interpreting and displaying a record of the electrical signals received from the logging tool, and an interconnecting cable which serves to conduct electrical signals and power between the tool and surface equipment, and also to support the tool during its passage through the bore.

Characteristically, acoustic logging tools have one or more longitudinally spaced acoustic transmitters and receivers located along the length of the tool. Appropriate electronic equipment is located within the tool housing for actuating the transmitter means to generate acoustic impulses which are transmitted through the borehole fluid and into the surrounding formations. Receiving transducer means respond to acoustic energy propagated through the formations causing electrical indications representative of the acoustic energy arriving at the receivers to be generated. Electrical signals representative of both the transmitted impulses and received impulses may be interpreted by a combination of electronic equipment either within the tool itself or at the surface of the earth, providing amplitude, velocity, and/or travel time indications. As the tool moves through the well bore, these indications are recorded as a function of depth in the well to provide a log of the formations.

Unfortunately, certain characteristics of the environment in which these measurements are made tend to introduce inaccuracies into such measurements. Since the acoustic transmitting and receiving transducers are not in direct contact with the formations to be investigated, being separated therefrom by an annulus of borehole fluid, it is necessary to consider the behavior of the acoustic wave transmitted through media having a variety of acoustic properties. To log through a casing, it is additionally necessary to consider energy dissipated by the filtering effect of such casing.

Problems encountered in obtaining a travel time measurement of formations located behind a casing have occasioned a need to provide systems to eliminate early arrivals of acoustic impulese travelling along the casing. Characteristically, such systems have required circuitry to eliminate the early arriving casing impulses from affecting the time measurements. Owing to the fact that acoustic energy is so greatly dissipated when transmitted through casing, the casing impulse represents the greater portion of the acoustic energy transmitted, and are considerably enhanced over the formation impulse. Such difficulties are encountered over a large spectrum of transmission frequencies and have heretofore been considered as a problem existing at any selected frequency or spectrum of frequencies. Spacing of receivers is a factor known to influence the value of measurements obtained, but, heretofore, no optimum spacing pattern has been developed consistant with the frequencies utilized.

Accordingly, it is an object of the present invention to provide new and improved acoustic logging apparatus and methods wherein substantial amounts of acoustic energy can be transmitted through a casing and into the formations rather than dissipated in the casing thereby permitting indications of travel time of acoustic impulses through the formations to be detected at the receiving transducers.

Another object of the present invention is to provide novel acoustic logging methods for logging formations through a casing wherein signal-to-noise ratios are greatly increased through selection of very nearly optimal transmission frequencies.

A still further object of the present invention is to provide novel acoustic logging methods and apparatus for logging formations through a casing wherein, through a combination of optimum frequency selection and optimum receiver spacing, more accurate formation travel times are derived.

Briefly, apparatus in which the present invention finds useful embodiment includes: a logging tool in which are mounted in descending order a first acoustic transmitter, first, second, third and fourth acoustic receivers and finally a second acoustic transmitter as shown in U.S. Pat. No. 3,304,537. In this system transmitter and receiver signals are derived from transmitter-receiver combinations, i.e., the first transmitter and second receiver, the first receiver and fourth receiver, the second transmitter and first receiver and the second transmitter and the third receiver. Thus, within a measurement cycle, four acoustic travel times between transmitter and an associated receiver are defined by the transmitter and associated receiver signals.

The transmitter and receiver signals representative of the travel times thus measured are supplied to a computer at the surface of the earth in which a predetermined arithmetic function is performed thereon, the particular function being correlated with the selected measurements sequence. The four-step measurement also automatically compensates for errors introduced by the borehole fluid and irregularities in the borehole wall or inclination of the tool. The entire operating cycle is synchronized from a readily available 60 cycle source which controls both the downhole and surface equipment.

The system of the invention includes a selected interrelation of the spacing between the transmitting and receiving transducers and the range of transmitting frequencies to provide high resolution indications of the formation characteristics to be determined where the formations are located behind a casing in a well bore.

The foregoing objects, features, and advantages of the present invention will become apparent from the following detailed description thereof and taken in conjunction with the accompanying drawings in which:

DESCRIPTION OF THE PREFERRED EMBODIMENT

Figure 1:
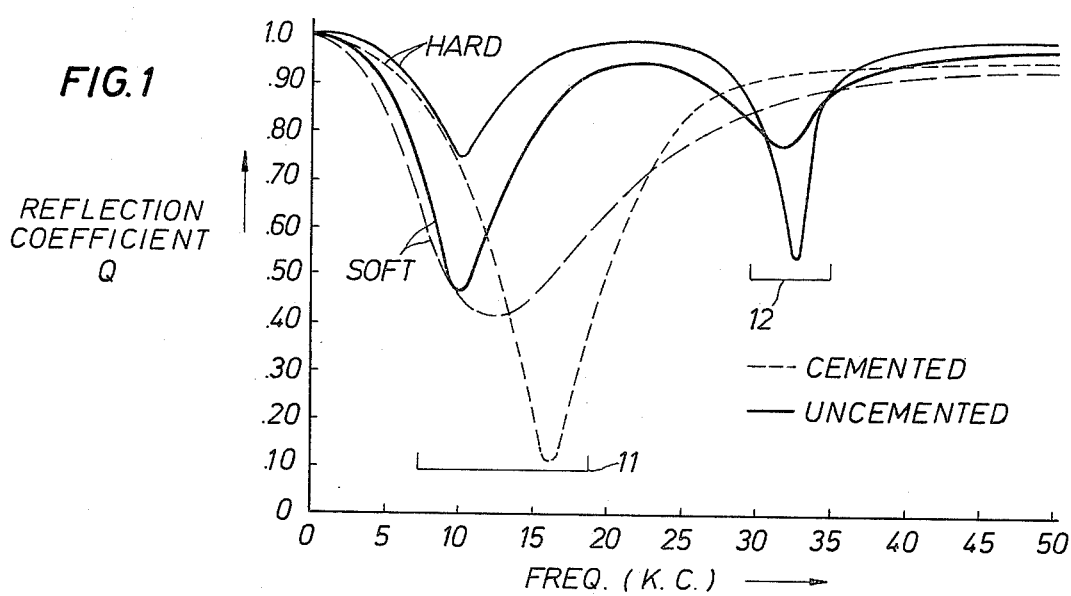
FIG. 1 is a graph of reflection coefficients versus acoustic transmitter frequency for different formation types behind cemented and uncemented casings.

In copending application Ser. No. 840,335 entitled, "Three Filter CQL Logging Methods" by Ralph G. Beil, now abandoned and refiled as continuation-in-part application Ser. No. 40,021, now U.S. Pat. No. 3,747,702, which is assigned to the assignee of the present invention, there are described methods and apparatus for Acoustic Cement Evaluation Logging which are based on the concept of examining certain parameters associated with the characteristic frequencies or radial modes or resonances of the well bore-casing-annulus-formation system. In the present invention, this concept also has utilization. Those principles involved in the cement evaluation problem are employed to define the optimum frequency range selection principles of the present invention. The derivation of the reflection coefficients application contained in the above mentioned copending application provides an explanation for the fact that the energy dissipated in the formations is functionally related to the frequency. It will be demonstrated that certain transmission frequencies yield a higher reflection coefficient indicative of energy dissipation within the borehole and casing thereby diminishing that amount of energy transmitted into the formations. Utilizing this principle in the present invention, it will be appreciated that selecting a frequency range which yields a relatively lower reflection coefficient is desirable in that a greater amount of acoustic energy is thereby transmitted into the formations. This is an important consideration when making acoustic travel time measurements through casing because, heretofore, inadequate signal-to-noise ratios have caused acoustic travel time logging through casing to be impractical.

The basic wave equation from which the reflection coefficient discussion is derived as follows:

$$\frac{1}{C^2} \frac{\delta^2 \phi}{\delta t^2} = \frac{\delta^2 \phi}{\delta r^2} + \frac{1}{r} \frac{\delta \phi}{\delta r} \quad (1)$$

where $\phi$ is a scalar potential function, $r$ represents the radial displacement at any given time $t$ and $C$ is the speed of compressional waves in the system. Equation 1 is derived from well-known physical principles and may, for example, be found in standard texts.

The scalar potential function $\phi$ is, of course, time dependent as well as dependent on $r$, i.e., $\phi = \phi(r,t)$. However, the time dependence may be taken to be that of a travelling wave [i.e., $\phi(r,t) = F(r) e^{i \omega t}$] where $\omega = 2\pi f$ is the angular frequency on the wave motion of frequency $f$. Using this relation Equation (1) may be brought into the form:

$$-\frac{\omega^2}{C^2} F = \frac{\delta^2 F}{\delta r^2} + \frac{1}{r} \frac{\delta F}{\delta r} \quad (2)$$

Equation (2) is recognized as a form of Bessel's Equation having a general solution which may be written in the form:

$$F(r) = A H_o^{(1)}(kr) + B H_o^{(2)}(kr) \quad (2a)$$

Here, $k = \omega/C$ and is the wave number of the $r$ waves. $H_o^{(1)}(kr)$ and $H_o^{(2)}(kr)$ are called Hankel functions of the first and second kind, zero order. The coefficients A and B may be thought of as the complex amplitudes of incoming and outgoing waves, respectively, the A's being the amplitude of incoming waves and the B's as the amplitude of outgoing waves. It can readily be appreciated that the ratio of A/B in the borehole fluid gives a measure of the amount of acoustic energy escaping into the adjacent formations.

The quantity A/B is the ratio of the amplitudes of incoming to outgoing waves in the mud inside the casing. Such a quantity is accessible to measurement and may be thought of as a reflection coefficient which indicates how much acoustic energy escapes in the radical direction from the system into the formation.

FIG. 1 shows representative reflection coefficient curves. The reflection coefficient Q (or A/B) is plotted versus frequency for both hard and soft formations and for both cemented and uncemented annuli around a casing. A value of the reflection coefficient near 1 indicates very little energy escaping radially into the formation. Lower values indicate more energy escaping into the formation at a particular frequency.

FIG. 1 is provided to demonstrate that there exists a range of frequencies over which the ratio of amplitudes of incoming to outgoing waves in all situations of interest is minimum. The first set of minima 11 is seen to occur in a frequeuncy range of 7.5 KHZ to 16 KHZ. As indicated, three minima 11 are representative of each of the cases of interest. These curves represent those possibilities which are to be encountered in the logging through casing environment and, as will be discussed below, depict significant interrelationship of factors affecting optimum frequency range selection. To enumerate the cases:

1. Hard formation-cemented annulus (minima at 16 KHZ)
2. Hard formation-uncemented annulus (minima at 10 KHZ)
3. Soft formation-cemented annulus (minima at 12.5 KHZ)
4. Soft formation-uncemented annulus (minima at 10 KHZ)

A second set of minima 12 for the uncemented cases occurs in a much higher frequency range approximately 31 KHZ to 33 KHZ. As can be observed, no such phenomena is observed for the cemented annuli.

This may be more readily understood by considering the damping effects of those media in contact with the casing. Although a consideration of this aspect has not been necessary to an understanding of the reflection coefficient phenomenon it becomes advantageous to consider such in order to more readily describe the oscillatory motion of the casing along wherein all effects of environment are treated as contributory to external loading.

FIG. 1 depicts the reflection coefficients as a function of frequency for a given borehole diameter, casing thickness, and casing diameter. It has been demonstrated that a similar situation exists when one or more of these parameters are varied. A detailed consideration of such variations is contained in the aforementioned copending application.

Figure 2:
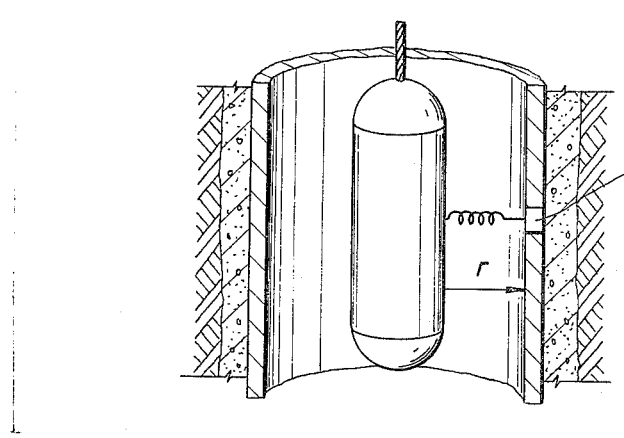
FIG. 2 is a schematic representation of a well bore casing considered as a damped mechanical oscillator.

Turning now to FIG. 2, a sonde is shown suspended in a well bore. Emanating therefrom, in the direction $r$ are the acoustic waves, such comprising the exciting force applied to the casing. The casing is depicted as cemented, but it should be understood that the present invention addresses itself to travel time measurements through uncemented casing as well.

Coincident with the consideration of the reflection of acoustic energy into the well bore as demonstrated in the preceding discussion, the present invention is described additionally, by a reference to the transfer characteristics of a damped mechanical oscillator with one degree of freedom wherein the damping results from internal friction and external loading. This is shown in FIG. 2 as analogous to the spring-mass dashpot system traditionally employed in describing damped linear harmonic motion. An elemental portion of the casing 21 is depicted as detached therefrom and constrained to motion in a direction defined by a longitudinal axis about which the spring is depicted (i.e., $r$). To be demonstrated is the fact that the casing may be considered as a low pass mechanical filter and that consequently, by providing a transmitter whose frequency response peaks between 8 and 13 KHZ, that formation arrivals at the receiving transducers are greatly enhanced over casing arrivals.

It is known that witht a sinusoidal input to a physical model of the damped mechanical oscillator of the form:

$$e = e_o \sin \omega t \tag{3}$$

the response may be represented by:

$$R = R_o \sin (\omega t + \phi) \tag{4}$$

wherein: $\omega$ = the angular frequency of the input of maximum amplitude $c_o$ and $\phi$ = the phase relationship of the response of maximum amplitude $R_o$.

The relationship of $e$ and $R$ may be described by a second order differential equation linear in $R$ with a forcing function $e$ or $$b_2 \frac{d^2R}{dt^2} + b_1 \frac{dR}{dt} + b_o R = A_o e \tag{5}$$

where $b_o$, $b_1$, $b_2$ and $a_o$ are cons.

That frequency at which a minimum of acoustical impedance is encountered, i.e., the natural angular frequency, $\omega_n$, may be expressed in terms of the coefficients of terms in expression (5), as $$\omega_n = (b_o/b_2)^{1/2} \tag{6}$$

and a measure of the damping $\zeta$ in the casing at any given frequency may be written $$\zeta = \frac{b_1}{2(b_o b_2)^{1/2}} \tag{7}$$

hereinafter referred to as the damping ratio.

Defining the variable $\mu$ as the ratio of any given frequency $\omega$ to the natural angular frequency $\omega_n$, or $$\mu = \omega/\omega_n \tag{8}$$

and the amplitude ratio $A(\mu)$ as a function of such variable, it may be shown that $$A(\mu) = \frac{R_o b_o}{e_o a_o} \tag{9}$$

A discussion of the interrelationships of the variable as expressed in formulae 8 and 9 may be found in Feedback Control Systems, J. C. Gille, M. J. Pelegrin, P. Decaulne, Chapter 6 and Mechanical Vibrations, J. P. Den Hartog, Chapter 2. It is seen that an algebraic manipulation of the above formulation will yield the following expression:

$$A(\mu) = \frac{1}{[(1-\mu^2)^2 + (2\zeta\mu)^2]^{1/2}} \tag{10}$$

which expression indicates a more direct functional dependence of $A(\mu)$ on $\zeta$.

Figure 3:
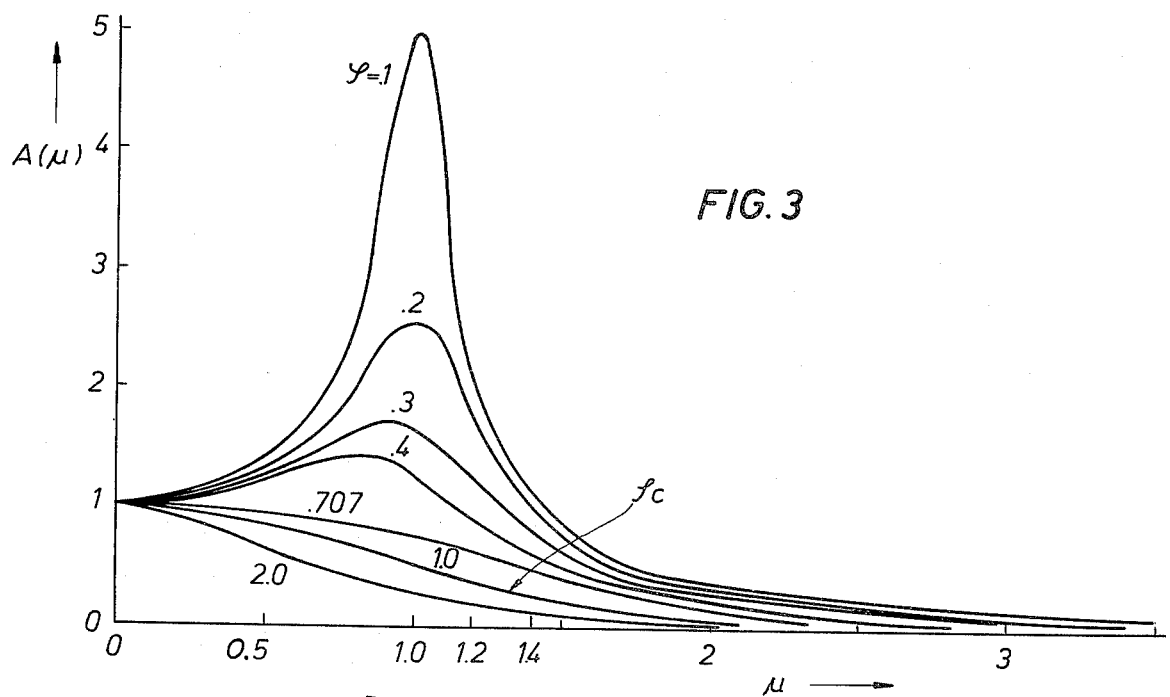
FIG. 3 is a graphical representation of the interrelationship among various parameters effecting frequency selection and receiver spacing.

FIG. 3 represents graphically the relationship between $A(\mu)$ and $\mu$ for different values of $\zeta$, i.e., different conditions of damping for a simple model of a casing. For a relatively undamped casing ($\zeta = 0.1$), the amplitude ratio $A(\mu)$ peaks at a frequency ratio of 1.0. This means that the casing would have a high response. As the damping ratio $\zeta$ increases, the amplitude ratio $A(\mu)$ decreases. The graph illustrates that the damping ratio and amplitude ratio have a marked relationship for a frequency ratio of $\mu$ equal to 1 which is the resonant frequency of the casing.

As a practical matter, damping ratios of 0.2 to 0.4 are more commonly encountered in well bores where the casing is cemented in place. Thus, a very good cement bonded annulus would give a damping ratio of about 0.4. There is a range of values for $A(\mu)$ between 1.0 and the set of ordinates corresponding to the 0.2 value of $\zeta$ wherein the amplitude ratio $A(\mu)$ is enhanced and permits transfer of significant energy to the media behind the casing. Hence, for a frequency ratio $\mu$ up to $\mu = 1.2$ to 1.4 or $$\omega = (1.2 \text{ to } 1.4)\omega_n \tag{11}$$

significant energy is transmitted to the formations behind the casing but at the same time, longer duration casing vibrations are set up. As will be hereinafter more fully explained, appropriate spacing of the transducers minimizes this effect.

Having established the natural resonance frequencies of those casings of those particular dimensions most commonly used, it is then necessary to compute a range of frequencies for the transmitter over which condition (11) holds. The natural resonance frequencies (radial mode) of a 5½ inches casing is around 13.5 KHZ and that of 9⅝ inches casing is around 7.7 KHZ. Thus, it has been found that a selection of a transmitter operable over a small range of frequencies centered about 10

KHZ provides, at each frequency, permissible values of the amplitude ratio.

Through an application of the principles described in the foregoing discussion and illustrated in FIG. 3, it has been demonstrated that, for those casing diameters of interest, high frequency energy transmission for purposes of acoustic travel time logging will have the effect of degrading or diminishing the quality of measurements obtained thereby rather than enhancing their value.

Further, by choosing a spectrum of frequencies about a central low frequency such that $\mu$ is confined in most cases to a neighborhood about 1, it has been found that the casing becomes relatively "transparent" to the acoustic energy transmitted so that traversal of the casing in both directions is facilitated.

Considering FIGS. 1 and 3, conjunctively it will be appreciated that both graphs have frequency as an ordinate axis. Thus, if the FIG. 3 ordinate is converted to frequency in KHZ there will be an inverse relationship between reflection coefficients and amplitude ratios in the neighborhood of the natural frequency of the casing. Because the damping ratio $\zeta$ of FIG. 3 is directly related to the existence of cement behind the casing a damping coefficient of relatively small magnitude will have an increased amplitude ratio $A(\mu)$ at the resonant frequency. For a similar resonant frequency the reflection coefficient Q (FIG. 1) is smaller for a cemented annulus than for an uncemented annulus.

In further explanation of the above relationship, the cement, in effect adds means to the mechanical oscillator described with respect to FIG. 2. This increases damping and thereby decreases $A(\mu)$. Relating this to the conditions imposed on the simple model of the mechanical oscillator, it may be said that, had the expression described the oscillatory motion of both the casing and the cement annulus, the casing itself would have been constrained to vibrations of smaller amplitude, but the annulus would have been excited to the same degree. Thus, this situation would occasion a greater energy transfer into adjacent formations.

Having chosen a frequency spectrum whose individual frequencies are known to be associated with amplitude ratio greater than 1 and with damping ratio consistently less than 1, it then becomes necessary to compensate for the increased time of casing vibration. It has been found that the spacing of the transmitters and receivers may be adjusted to solve this problem.

The principles of the present invention have been applied to all such cases, in widely varying well logging environments in order to discover an optimum minimum value for the spacing between the lower transmitter and the lowest receiver. This value has been found to be five feet. Such spacing, in combination with the frequency spectrum utilized in the present invention provides logging results which have not been available in previous acoustic logging systems.

It is to be recalled that the most desirable situation to be realized is that in which there is a maximum amount of acoustic energy transmitted into the adjacent formations. As has been demonstrated by reference to a one degree of freedom mechanical oscillator, there exists a spectrum of frequencies within which a casing may be caused to oscillate at an amplitude greater than for any other range of frequencies. Clearly, that which is in contact with the oscillating casing will be excited to a greater degree also. As has been discussed both in terms of reflection coefficients and mechanical oscillations, the foregoing result obtains at the resonance frequency of the casing and in the frequency spectrum in the neighborhood about such resonance frequency.

Where the amplitudes of the casing oscillations are substantially increased, significant problems are encountered owing to the increased duration of such oscillations. The problems are particularly apparent in those instances in which the formation arrival is to be discriminated on the basis of amplitude.

Various factors affect the amplitude and duration of the casing vibrations. The effect of the most significant parameters may be broken down into four cases. These cases having been expressed earlier in terms of formation characteristics and cement bonding are expressed at this time in terms of formation travel time and cement bonding. For the most part, soft formations may be thought to correspond to travel times of relatively long duration with hard formations corresponding to travel times of relatively short duration. Expressing a travel time as $\Delta t$ and choosing subscripts to express relative magnitudes of $\Delta t$, $\Delta t$ small are those values of $\Delta t$ in a range up to and including the timee required to traverse one foot of casing in 57 microseconds. All those compressional wave travel times greater than 57 microseconds will be represented by the symbol $\Delta t$ large.

The cases to be considered are:
1. $\Delta t$ small/good cement bonding
2. $\Delta t$ large/good cement bonding
3. $\Delta t$ small/poor cement bonding
4. $\Delta t$ large/poor cement bonding Those cases in which the formation travel time $\Delta t$ is relatively small in comparison with the casing travel time may be considered from the standpoint of the delay time required prior to turning on the receiving transducer located at minimum spacing from the transmitter. Such a receiving transducer is turned on at the earliest possible time at which any known formation arrival could occur. This is a time prior to a predictable casing arrival which occurs always at a constant $\Delta t$ for any given casing. The only spacing problem to be considered for all such cases is that of spacing the receiving transducer near enough to the transmitter that the formation signal will be of sufficient strength to be sensed by such receiver. In both cemented and uncemented annuli, it has been found that sufficient acoustic energy is transmitted in the frequency spectrum of the present invention so that the nearest receiver to the transmitter may be placed at a distance of five feet without significant degradation of the formation arrival. In the event that the formation travel time is very nearly the same as the casing travel time, increased spacing, that is, five foot spacing, will cause the difference between the two, however slight, to be exaggerated so that formation arrival times may be more readily discriminated.

Turning now to the two cases in which the formation travel time is relatively great (i.e., the two $\Delta t$ large cases) in comparison with the casing travel time, we see that receiver spacing becomes a more significant problem than in the cases discussed above. In this instance, the cement bonding becomes a critical factor to be considered. It is known that because of the choice of frequency spectrum which is intended to optimize energy transfer, such frequencies being in a neighborhood about the resonance frequency for the casing, that the amplitude of oscillations of the casing will be a maximum. In the event that good cement bonding exists, these oscillations are rapidly damped out. The amplitude of the signal transmitted into the formation will not be appreciably diminished during the travel time from the transmitter to the first receiver. However, the casing signal received at the first receiver will be of diminished amplitude thereby making it feasible to discriminate between formation arrivals and casing arrivals on the basis of amplitude. Clearly, increased spacing will, in this event, contribute greatly to such discrimination.

Heretofore, increasing the spacing between transducers has been objectionable owing to the fact that attenuation of the formation signal was too great. Transmission of a greater amount of acoustic energy into the formation has enhanced this signal to such a degree that spacing patterns hereinabove considered impractical may now be utilized. Such novel and efficient receiver spacing has made it possible to receive and interpret signals representative of formation characteristics which have heretofore gone undetected.

In the event that there exists adjacent to the casing, a poor cement bond or no cement and relatively soft formations, such that formation travel times are relatively large, it has been found that the amplitude of the signal propagated longitudinally along the casing will in many cases be so great as to obscure the formation arrival; however, there are many situations in which the cement bonding varies in quality considerably, i.e., wherein some degree of bonding does exist. For this reason the use of maximum energy transfer and optimum receiver spacing has been found to improve amplitude discrimination in many of the case situations as well. In many instances there exists only a limited range of formations $\Delta t$'s which are difficult to obtain. This occurs over a range of values ranging from the predictable casing arrival time up to some lower limit for the formation arrival time representing the earliest time at which the casing may have damped below the discrimination level. This is true over a range of values of increased formation energy levels.

Although reception and discrimination of signals in the case of $\Delta t$ large or poor cement bonding remains a problem, more nearly optimal receiver spacing has greatly improved the quality of measurements adjacent soft formations. This is true for both good and poor cement bonding.

To summarize, the present invention optimizes both frequency selection and receiver spacing consistent with obtaining valid formation travel time indications for each of the four cases enumerated above. Certain trade-offs not available in earlier systems utilizing higher frequencies have appeared in the present invention. The present system allows the receivers to be placed at greater distances from the transmitters at the expense of some formation signal attenuation, which by virtue of the increased initial amplitude of the signals may be tolerated. That which has been achieved through this approach is higher resolution for fact formations owing to the fact that all $\Delta t$ differences are increased with increased spacing and for slower formation arrivals amplitude discrimination is made more feasible and more readily interpretable by virtue of the increased damping effects on the casing with increased travel time and distance between transmitters and receivers.

Figure 4:
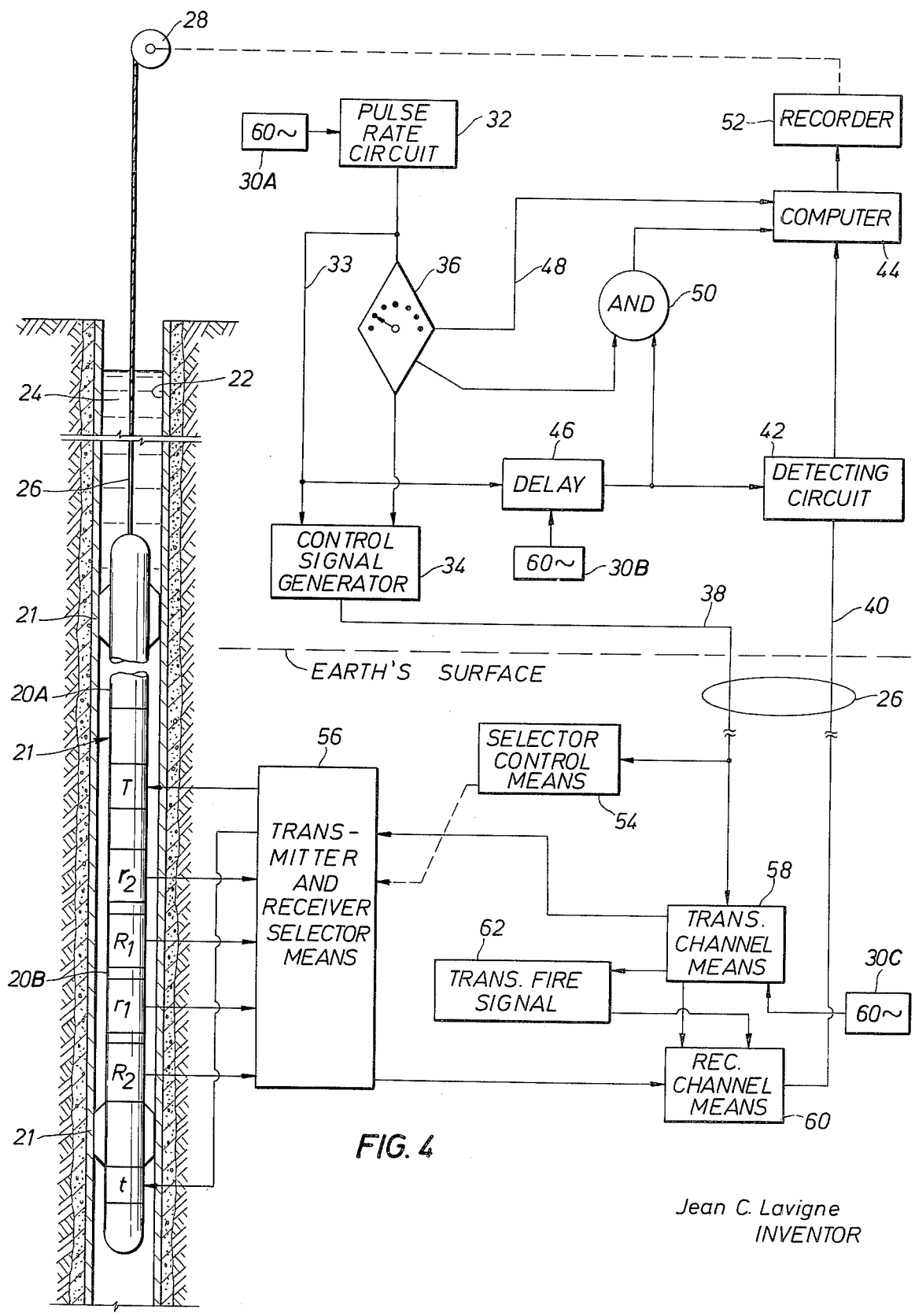
FIG. 4 shows an embodiment of a logging system using the principles of the present invention and illustrated in block form.

In FIG. 4, the present invention is shown embodied in conjunction with an acoustic well logging tool of conventional nature, such as an acoustic travel time logging tool of the borehole effect compensated type. Details of the operation of the acoustic logging tool shown in FIG. 4, may be found by reference to U.S. Pat. No. 3,304,537 which is assigned to the assignee of the present invention. This tool has a plurality of acoustic transmitters and spaced receivers and may be employed for acoustic travel time logging over a portion of the borehole where the borehole effects are compensated for by making a plurality of measurements of acoustic travel time between each transmitter and a plurality of receivers and then combining these acoustic travel time measurements to obtain an average measure over a fixed interval Energy is propagated longitudinally along the borehole and its surrounding formation in such a manner as to enable the principles of the present invention to be applied with tools such as that shown in FIG. 4. It will, of course, be appreciated by those skilled in the art that other conventional acoustic logging tools other than the borehole compensated type could be used to practice the present invention. For purposes of brevity, practice of the methods of the present invention will be disclosed with a borehole effect compensated tool but it will be understood that the present invention is not limited to practice with such a tool.

Referring now to FIG. 4, the overall organization of a well logging system utilizing the principles of the present invention is shown in block form. An elongated logging tool 20 is suspended in a cased borehole 22 and is provided with the usual centralizers 21 adjacent its upper and lower ends for maintaining the tool centered as effectively as possible in the borehole 22. Borehole 22 is filled with the usual drilling mud or fluid 24.

The tool 20 is suspended in the well bore by means of an armored cable 26 extending from the upper end of the tool to the surface of the earth. The cable is spooled on a winch 28 (shown schematically), as is well-known in the art, the operation of which serves to raise and lower the tool through the well bore. Cable 26 may contain a plurality of conductors for providing paths for electrical signals between the surface equipment and the downhole apparatus, as well as to supply electrical power from a source on the earth's surface to the downhole equipment.

The tool 20 itself is divided into two portions. The upper portion 20A houses the electronic equipment carried by the tool while the lower portion 20B serves as a support for the acoustic transmitters T and t and receivers $R_1$, $r_1$, $R_2$ and $r_2$. Although not illustrated in the drawing, it will be understood by those skilled in the art that the portion 20B of the housing can be so constructed that direct transmission of acoustic energy therethrough from the transmitters to the receivers is either suppressed to a negligible level or delayed with respect to the travel times through the formations as to not interfere with measurements. Various types of housing construction such as of open work design are known in the art for this purpose.

The surface equipment of the system is shown generally in block form above the dotted line in FIG. 4. The master reference frequency for the overall operation of the logging system is provided by a 60 cycle per second power source which may be obtained from commercial power lines where available or from separate generators. Preferably, power is conducted from its source at the surface to the surface equipment and by suitable conductors in the cable 26 to the downhole equipment. For ease of illustration three separate 60 cycle per second inputs 30A, 30B and 30C are shown in FIG. 4. As will be seen from the ensuing description the 60 cycle per second source provides operating power for the electronic equipment as well as providing a reference frequency.

Master timing pulses from synchronizing the various components of the system are generated by the pulse rate circuit 32. This circuit provides a train of sharp pulses whose frequency is an integral submultiple of the 60 cycle reference frequency. Thus, for example, the repetition frequency of the timing pulses generated by the circuit 32 may vary from one-ninth to one-half of the 60 cycle reference frequency. Of course, other frequencies or ratios could be used if desired. Between each pair of successive pulses generated by the rate circuit 32, an individual measurement of transmitter to receiver travel time may be made. The pulse frequency selected will depend on the particular type of formations expected to be encountered. A timing pulse rate that has been found suitable for a wide variety of applications is 20 pulses per second which provides a spacing between successive timing pulses of 50 milliseconds.

Timing pulses generated in pulse rate circuit 32 are transmitted via a conductor 33 directly to a control signal generator 34. The timing pulses also serve to synchronize operation of a selector programmer 36 whose output is delivered to the control signal generator 34. The selector programmer 36 may be provided with means such as a manually actuated switch arm which enables any of a plurality of measuring sequences for acoustic travel time measurements to be selected. Between each successive pair of timing pulses from the rate circuit 32, the control signal generator provides a control signal over conductor 38 to the downhole equipment.

Electrical signals indicative of the acoustic measurements made in the downhole equipment are transmitted to the surface over conductor 40 in the cable 26. These signals are supplied to a detecting circuit 42 which produces an input correlated with the travel time measurements and which is suitable as an input to the travel time computer 44. Detecting circuit 42 is rendered responsive to electrical signals transmitted from the downhole equipment by timing pulses from the pulse rate circuit 32 transmitted via a fixed delay means 46. Delay means 46 is synchronized with the 60 cycle reference frequency 30B and ensures that the detecting circuit is not rendered operative until just prior to the expected arrival of a signal from the downhole equipment. This minimizes the possibility of errors resulting from spurious signals.

Computer 44 is enabled for operation directly from the programmer 36 and computer 44 is also conditioned by the output of AND circuit 50 which is responsive to the simultaneous application of signals from the delay means 46 and the programmer 36. These instruction signals supplied to the computer 44 dictate the particular arithmetic sequence which is to be performed for acoustic travel time logging. They also provide computer 44 with reset information to prepare for the next computation cycle.

Output from computer 44 is in the form of electrical signals which are fed to indicating means such as recorder 52. As indicated by the dotted line the record feeding means for the recorder is mechanically linked to the winch 28 for movement therewith, whereby a plot of the acoustic travel time logs versus depth in the well are obtained.

Control signal pulses from the control signal generator 34 are conducted via a conductor 38 in the cable 26 to operate the downhole equipment shown below the dashed line FIG. 4 which is housed in the upper portion 20A of the logging tool 20. This equipment includes a selector and control means 54 which interprets the received control signal pulses to select a specific transmitter receiver combination to be activated during each measurement cycle. The actual selection is accomplished by a transmitter and receiver selector means 56 which responds to the selector control means to put into circuit the particular transmitter-receiver pair desired.

The control signal pulses from the control signal generator 34 at the surface are also supplied to a transmitter channel means 58 in the downhole equipment. Transmitter channel means 58 is synchronized with a 60 cycle reference frequency 30C and performs a threefold function. Firstly, the transmitter channel means 58 provides an output current pulse to activate the transmitter selected by the selector means 56. This generates the acoustic energy for making travel time measurements.

The transmitter channel means 58 also provides a blocking signal to deactivate a portion of the receiver channel means 60. The receiver channel 60 comprises a multi-stage amplifier provided with gating means to prevent an input signal to the first stage from reaching its output stage. The output of the transmitter channel means 58 supplies a blocking signal to the receiver channel means 60 which begins just prior to the generation of the transmitter output pulse and continues to a time just prior to the earliest possible arrival of a signal from the selected receiver. Thus, spurious signals or cross-talk, cannot be transmitted by the receiver channel means 60 to the surface equipment during this period. The input stage of the receiver channel means 60 is coupled by the selector means 56 to the selected receiver.

Transmitter channel means 58 also generates a transmitter fire signal at the time the transmitter is pulsed. This signal is a narrow pulse indicating the time of firing of a transmitter. The fire signal pulse is coupled to the unblocked output stage of the receiver channel means 60 and is transmitted immediately to the surface by conductor 40 indicating that a transmitter has been fired at this time.

After the input stage of the receiver channel means 60 is unblocked electrical signals resulting from the impinging acoustic energy sensed by the selected receiver will be amplified and transmitted to the surface by cable conductor 40. For each measurement then, there will be supplied to the surface equipment both a making pulse indicative of the time of the firing of the transmitter and an electrical signal corresponding to the impinging acoustic energy at the associated receiver. it will be understood of course, that the selected receiver in the logging tool converts the impinging acoustic energy into electrical signals having a waveform representative of such acoustic energy in a conventional manner.

As the details of the operation of the equipment for making acoustic travel time measurements may be had by reference to the above-mentioned patent, this will not be discussed further.

Since various changes or modifications in the above described apparatus may be apparent to those skilled in the art without departing from the inventive concepts involved, it is the aim of the appended claims to cover all such changes and modifications falling within the true spirit and scope of the present invention.

I claim:

1. Apparatus for acoustic logging of earth formations located behind a casing bonded to a cement annulus in a well bore comprising:
   an elongated body member sized for passage through a well bore;
   at least one transmitter, having a center frequency of approximately 10,000 cycles per second, carried by said body member; and
   at least one receiving transducer carried by said body member and responsive to energy transmitted by said transmitter, said receiving transducer being spaced vertically from said transmitter at a distance sufficient to attenuate the acoustic energy traveling along the casing upon the arrival thereof at said receiving transducer to a level permitting detection by said receiving transducer of the energy traveling through the formations upon the arrival thereof at said receiving transducer.

2. The apparatus of claim 1 wherein said receiving transducer is spaced at least five feet from said transmitter.

3. The apparatus of claim 1 wherein said transmitter transmits acoustic energy having significant components over a frequency range which spans the natural resonance frequencies for casings of various diameters.

4. The apparatus of claim 1 wherein said transmitter transmits acoustic energy having significant components over a frequency range, of from about 7,700 cycles per second to about 13,500 cycles per second.

5. Apparatus for acoustic logging of earth formations located behind a casing bonded to a cement annulus in a well bore comprising:
   an elongated body member sized for passage through a well bore;
   a plurality of acoustic transmitters carried by said body member in longitudinally spaced relation for transmission of acoustic energy into the formations at a frequency which peaks below 12,000 cycles per second;
   a plurality of acoustic receivers mounted on said body member and longitudinally spaced apart from said transmitters by a predetermined spatial relationship which is dependent on the operating frequency of the transmitters and is such that the acoustic energy traveling along the casing is attenuated upon the arrival thereof at any of said receivers to a level permitting detection by any of said receivers of the energy traveling through the formations upon the arrival thereof;
   a master pulse source for generating periodic pulses having a given time relationship for defining successive measurement intervals;
   signal generating means synchronized by said periodic pulses for selectively providing during a portion of each measurement interval control signals representative of one of a plurality of selected transmitter-receiver pairs;
   means responsive to said control signals for actuating the transmitter of said selected pair to generate a pulse of acoustic energy and for enabling an output to be obtained from the receiver of said pair during some portion of each measurement interval;
   means for deriving during each measurement interval an electrical indication of the acoustic energy travel time through the adjacent formations between the transmitter and receiver of said pair; and
   means responsive to the electrical indications derived over a plurality of measurement intervals for providing a continuous record of said signals.

6. The apparatus of claim 5 wherein each of said transmitters has a center frequency of approximately 10,000 cycles per second.

7. The apparatus of claim 5 wherein said plurality of transmitters comprise two transmitters and wherein said plurality of receivers comprise four receivers and wherein said transmitters and receivers are aranged within said elongated body member from top to bottom in the following manner:
   a. a first transmitter
   b. a first receiver
   c. a second receiver
   d. a third receiver
   e. a fourth receiver
   f. a second transmitter the spacing between said fourth receiver and said second transmitter and the spacing between said first transmitter and said first receiver being approximately 5 feet.

8. A method for performing acoustic travel time logs of formation disposed behind a cased well borehold comprising the steps of:
   generating an acoustic energy impulse having a center frequency of approximately 10 thousand cycles per second at a first point in a cased borehole;
   receiving at a distance of approximately 5 feet or more from said first point an acoustic energy impulse which has traveled through the formations surrounding the cased borehole; and
   measuring the amount of time which has elapsed between said generating step and said receiving step.

9. A method for performing acoustic travel time logging of formations through casing in a well bore comprising the steps of:
   a. generating at a first point within said casing acoustic energy impulses into and through said casing, said impulses having a center frequency of approximately 10 thousand cycles per second;
   b. receiving said acoustic energy impulses at a distance from said point functionally dependent on the center frequency at which acoustic energy impulses are generated in that said distance is that at which received formation impulses are enhanced over received casing impulses;
   c. measuring the amount of time which has elapsed between said generating step and said measuring step.

10. A method of acoustically investigating earth formations located behind a casing in a well bore comprising:
    determining the lowest frequency range which spans the respective frequencies at which maximum energy transfer through the casing is afforded for plural sets of different well bore conditions, including variation among the sets of at least one of (1) the diameter of the casing, (2) the hardness, density, porosity or permeability of the earth formations surrounding the well bore and (3) the bonding of cement to, or the presence of cement behind, the casing;

transmitting through the casing and into the surrounding earth formations, at a first point in the well bore, an acoustic impulse having a center frequency within said range; and detecting a portion of the acoustic energy traveling through said earth formations at a second point spaced along the well bore from said first point.

11. The method of claim 10 wherein the frequencies at which maximum energy transfer is afforded are determined by ascertaining the frequencies at which the reflection coefficients for each set of different well bore conditions are minimum.

12. The method of claim 10 further comprising:

determining the natural resonance frequency for each of a plurality of casings of different diameters; and transmitting said acoustic impulse at a frequency such that the ratio of said transmission frequency to the natural resonance frequency of each of said casings is not substantially greater than 1.4.

13. A method of acoustically investigating earth formations behind a casing in a well bore, comprising:

at a first point in the well bore transmitting an acoustic energy impulse having a center frequency of approximately 10,000 cycles per second; and detecting a portion of the acoustic energy traveling through the formations at a second point spaced along the well bore from said first point by a distance sufficient to attenuate the acoustic energy traveling along the casing upon the arrival thereof at said second point to a level permitting detection of the energy traveling through the formations upon the arrival thereof at said second point, thereby facilitating detection of energy transmitted through the formations behind a casing.

14. The method of claim 13 wherein said acoustic energy impulse includes significant components over the frequency range of from about 7,700 cycles per second to about 13,500 cycles per second.

15. The method of claim 14 further comprising measuring the elapsed time between the transmission of the acoustic energy impulse at said first point and the arrival of the energy traveling through the formations at said second point, thereby to obtain an indication of the acoustic velocity of the formations.

16. Apparatus for acoustic logging of earth formations located behind a casing bonded to a cement annulus in a well bore, comprising:

an elongated body member sized for passage through a well bore;

at least one transmitter, having a center frequency of less than 12,000 cycles per second, carried by said body member; and a plurality of receiving transducers carried by said body member and responsive to energy transmitted by said transmitter, said receiving transducers being positioned at different distances from the transmitter, which distances are each sufficient to attenuate the acoustic energy traveling along the casing upon the arrival thereof at the associated receiving transducer to a level permitting detection by said associated receiving transducer of the energy traveling through the formations upon the arrival thereof at said associated receiving transducer.

17. The apparatus of claim 16 wherein said transmitter has a center frequency of approximately 10,000 cycles per second.

18. A method of acoustically investigating earth formations behind the casing in a well bore, comprising:

at a first point in the well bore transmitting an acoustic energy impulse having a center frequency of less than 12,000 cycles per second; and detecting portions of the acoustic energy traveling through the formations at a plurality of points spaced along the well bore from said first point by different distances, each of which distances is sufficient to attenuate the acoustic energy traveling along the casing upon the arrival thereof at the associated point to a level permitting detection of the energy traveling through the formations upon the arrival thereof at said associated point, thereby facilitating detection of energy transmitted through the formations behind the casing.

19. The method of claim 18 wherein said center transmission frequency is approximately 10,000 cycles per second.

* * * * *

UNITED STATES PATENT AND TRADEMARK OFFICE
CERTIFICATE OF CORRECTION

PATENT NO. : 3,909,775
DATED : September 30, 1975
INVENTOR(S) : Jean C. Lavigne

It is certified that error appears in the above–identified patent and that said Letters Patent are hereby corrected as shown below:

Col. 1, line 57, "impulese" should be -- impulses --;
Col. 2, lines 4 and 5, "consistant" should be -- consistent --;
Col. 3, line 49 "$\frac{\delta^2 \phi}{\delta l^2}$" should be -- $\frac{\delta^2 \phi}{\delta r^2}$ --;
Col. 3, line 65, "$\frac{\delta^2 F}{\delta l^2}$" should be -- $\frac{\delta^2 F}{\delta r^2}$ --;
Col. 4, line 22, "radical" should be -- radial --;
Col. 4, line 37, "three" should be -- these --;
Col. 4, line 63, "along" should be -- alone --;
Col. 5, line 53, "cons." should be -- constants. --;
Col. 7, line 42, "specturm" should be -- spectrum --;
Col. 8, line 23, "timee" should be -- time --;
Col. 8, line 63, before "frequency", insert -- a --;
Col. 9, line 16, "hereinabove" should be -- hereinbefore --;
Col. 9, line 58, "fact" should be -- fast --;
Col. 10, line 14, after "interval", insert a period;
Col. 12, lines 57 and 58, "making" should be -- marking --;
Col. 12, line 60, "it" should be -- It --;
Col. 13, line 38, after "range", delete the comma;
Col. 14, line 19, "aranged" should be -- arranged --;
Col. 14, line 27, "the spacing" Should begin a new line; and
Col. 14, line 32, "borehold" should be -- borehole --.

Signed and Sealed this thirteenth Day of January 1976

[SEAL]

Attest:

RUTH C. MASON
Attesting Officer

C. MARSHALL DANN
Commissioner of Patents and Trademarks